Oct. 22, 1935.  C. D. TRIPOLITIS  2,017,876

EXTENSOMETER

Filed Dec. 19, 1931

INVENTOR:
C. D. Tripolitis, by Murray C. Boyer
Atty

Patented Oct. 22, 1935

2,017,876

UNITED STATES PATENT OFFICE 2,017,876

EXTENSOMETER

Constantine D. Tripolitis, Santa Monica, Calif., assignor to Baldwin-Southwark Corporation, Eddystone, Pa., a corporation of Pennsylvania Application December 19, 1931, Serial No. 582,000

5 Claims. (Cl. 33—147)

My invention relates to extensometers, that is, apparatus for measuring the extension or compression of test specimens of sheet metal, wire, and the like, to which a tensional or compressive stress is being imparted.

Extensometers, as heretofore known, have, as compared with the device of my invention, been comparatively heavy, unbalanced mechanisms. Such devices, when attached to the specimen, will not balance perfectly about the two major axes of the same and hence their unbalanced condition is reflected in the reading of the indicating device of the extensometer which cannot be compensated adequately. Furthermore, such prior devices cannot be kept fastened to the specimens until failure thereof occurs without risk of damage to the instrument and, therefore, no readings can be taken at the critical point immediately preceding failure.

One object of my invention is to provide an extensometer which, when attached to the test specimen will not, due to its own unbalanced condition, impart thereto extraneous forces which will be indicated upon the indicating dial.

A further object of my invention is to provide an extensometer which may be maintained in its position of attachment to the test specimen until the specimen has failed under stress without risk of damage to the instrument.

And a still further object of my invention is to provide a new and novel form of extensometer.

Referring to the drawing, in which I have illustrated one embodiment of my invention;

Figure 1:
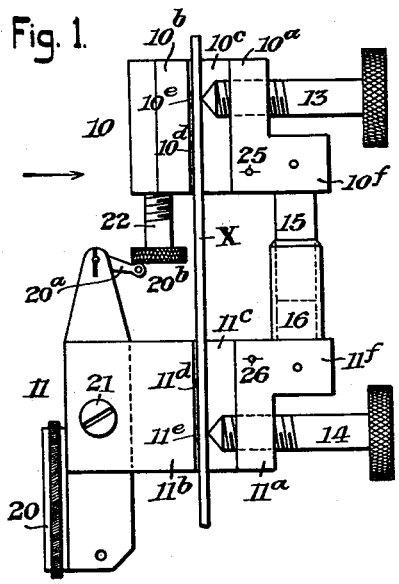
Figure 1 is a side elevation of an extensometer exemplifying my invention, and showing the instrument attached to a specimen under no stress.

The improved extensometer embodying my invention and illustrated in the accompanying drawing may comprise two gripping members 10 and 11. Each of these members is substantially channel-shaped in plan view with flanges 10$^a$, 10$^b$ and 11$^a$, 11$^b$, respectively providing recesses 10$^c$ and 11$^c$ for the reception of test specimens. The inner faces 10$^d$ and 11$^d$, of the flanges 10$^b$ and 11$^b$, respectively, form plane surfaces in which small anvils 10$^e$ and 11$^e$ are mounted against which a test specimen, indicated at X may be held by pointed thumb screws 13 and 14, threaded through the flanges 10$^a$ and 11$^a$, of the gripping members 10 and 11, respectively.

A projecting portion 10$^f$ of the flange 10$^a$ of the member 10 may carry a stud 15, which may be circular in cross section, with its axis at right angles to the axes of the thumb screws 13 and 14 and parallel with the surfaces of the inner faces 10$^d$, 11$^d$ of the flanges 10$^b$, 11$^b$, respectively. A tubular section 16 is fixed to a projecting portion 11$^f$ of the flange 11$^a$ of the member 11, with its axis coinciding with the axis of the stud 15, and the bore of the tubular section is of such size that the stud 15 may move freely therein without much play. The lengths of the stud 15 and cylinder 16 are such that the stud may remain within the cylinder within the limit of separation of the two gripping members in the use of the instrument. While the sum of the amount of contraction of two pieces of a specimen which has been broken may be no more than the amount which the specimen, as a single piece, was extended, the combined length of the stud and cylinder which it fits may be twice the amount of extension of a specimen measured by the instrument. Longer parts may be employed if desired and in some instances these telescoping parts may be omitted.

When these telescoping parts are employed, the members 10 and 11 of the extensometer are prevented from falling apart and coming sharply into contact with other objects.

Figure 2:
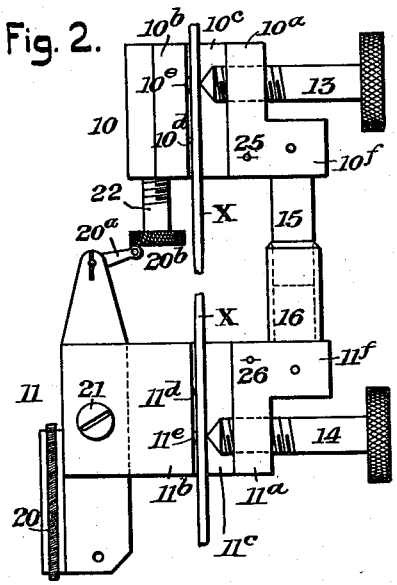
Fig. 2 is a view similar to that of Fig. 1, but showing the extensometer attached to a specimen that has been stressed past the breaking point.
Figure 4:
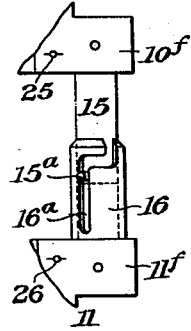
Fig. 4 is a fragmentary view illustrating a detail of my invention.
Figure 3:
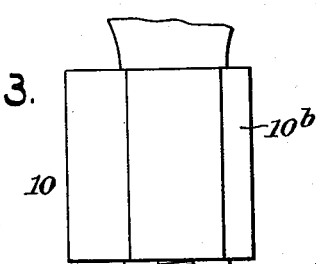
Fig. 3 is an elevation of the extensometer as attached to a specimen, looking in the direction of the arrow, Fig. 1.
Figure 5:
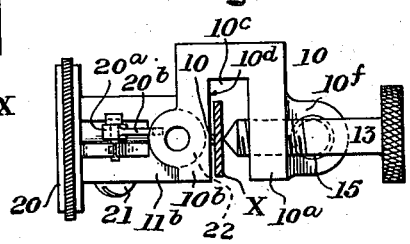
Fig. 5 is a plan view of the structure.

While provision of the telescoping parts such as shown in Figs. 1 and 2 may be desirable when the conventional test strips of metal of certain types are being tested, it may be of advantage, when pieces of flexible wire are under test to use a modified form of stud and tube arrangement which may be such as that illustrated in Fig. 4, in which similar numbers refer to similar parts. This stud and tube arrangement is identical with that heretofore described except that the stud may be provided with a pin 15$^a$ adapted to ride in a slot 16$^a$ of the bayonet joint type formed in the tubular section 16. Such arrangement will prevent the escape of the stud from the tubular section when the lower portion of a broken test piece has insufficient stiffness to support the weight of the lower part of the extensometer. At the same time the shape of the slot will permit ready separation of the parts.

The flange 11$^b$ of the member 11 is formed with a slot 11$^g$ in which may be mounted an extension indicating device such as shown at 20, which may be held in place by a set screw 21. The indicating device 20 does not form a part of this invention and, as many suitable types are well known in the art, it will not be herein described except insofar as it relates to the subject-matter of my invention. The indicating device 20 includes a pivoted elbow arm 20ª, the end 20ᵇ of which may be caused to move by a force applied thereagainst. The movement of the elbow arm is transmitted through suitable mechanism to a revolving pointer 20ᶜ adapted to move around a circular graduated dial 20ᵈ. Adjustably mounted in the flange 10ᵇ of the gripping member 10 in parallel relation to the face 10ᵈ thereof and consequently parallel to any test piece that may be mounted against the anvil point 10ᵉ carried thereby is an adjusting thumb screw 22. The end 20ᵇ of the elbow arm 20ª bears against the head of this screw and is lightly held thereagainst by suitable tension means within the indicating device 20 so as to maintain the pointer 20ᶜ in registry with the zero or other position on the dial 20ᵈ. Thus I provide means apart from the indicating device for adjusting such device to the zero position upon the insertion of each test specimen.

Inasmuch as extension of a test specimen is a function of length I preferably provide gauging marks 25 and 26 on the gripping members 10 and 11, respectively, for alignment of the specimen holders with respect to suitable portions of the specimens.

While other material may be employed, I prefer to make the sections 10 and 11 of my improved instrument of aluminum thereby eliminating all unnecessary weight that might otherwise affect a testing operation.

Various modifications may be made in the above described embodiment of my invention without departing from the spirit and scope thereof at set forth in the following claims.

I claim:

1. An extensometer comprising a pair of independent gripping members or clamps adapted to be attached to a test specimen and to be bodily movable away from each other upon imparting a tensile stress to such test specimen, means for holding said gripping members in juxtaposition to each other upon failure of the specimen at a point between the points at which it is held by the gripping member, and indicating means pivotally supported by one of said gripping members and with a portion thereof resiliently held in operative contact with the other of said gripping members.

2. An extensometer comprising a pair of independent specimen-gripping members adapted for bodily movement toward or away from each other upon the exertion of a compressive or tensional stress upon a specimen held between the same, a device carried by one of said specimen-gripping members for indicating variations in the distance between said members, and means carried by the other of said specimen-gripping members and contacting with a resilient portion of said indicating device for adjusting the reading of said indicating device when the gripping members are in stationary engagement with a test specimen and prior to a test.

3. An extensometer comprising two independent clamping members adapted for disposal in spaced relation and constructed to receive and hold a test piece, anvils carried by said members against which such specimen may lie, a tubular socket carried by one of said members, a stud on the other member adapted for sliding engagement with said tubular socket; said complemental engaging members being arranged in a plane parallel with the test-piece-receiving spaces of the clamping members, screws carried by each of said clamping members and adapted to hold a test specimen in engagement with the fixed anvils carried by each member, an indicating device carried by one of said clamping members, and an adjusting screw mounted in the other clamping member and positioned to contact with a resiliently supported operating part of said indicating device.

4. An extensometer comprising a pair of substantially U-shaped gripping members each having a pair of oppositely disposed flanges with a connecting web providing test-specimen-receiving spaces; an anvil carried by one of the flanges of each gripping member and each of the opposite flanges carrying an extension, a tubular socket on the extension of one gripping member, a stud on the extension of the other gripping member adapted for sliding engagement within said socket; said complemental engaging elements being disposed in parallel relation with respect to the spaces of the U-shaped gripping members in which a test specimen is mounted, clamping screws passing through said opposite flanged sides and adapted to hold a test specimen in fixed engagement with said anvils, an indicating device pivotally supported by one of said U-shaped gripping members, and an adjusting screw carried by the other U-shaped gripping member and positioned to contact with a resiliently supported operative part of said indicating device.

5. An extensometer comprising a pair of independently separable and substantially U-shaped gripping members each having a pair of oppositely disposed flanges with a connecting web providing test-specimen-receiving spaces; one of the flanges of each gripping member carrying an anvil and each of the opposite flanges carrying a lateral extension, a tubular socket on the extension of one gripping member, a stud on the extension of the other gripping member adapted for sliding engagement within said socket; said complemental engaging elements being disposed in a plane parallel with the plane of the spaces between the flanges of the U-shaped gripping members in which a test specimen is mounted, clamping screws passing through the opposite flanged sides of each gripping member and adapted to hold a test specimen in fixed engagement with said anvils, an indicating device pivotally supported by one of said U-shaped gripping members on the side opposite the clamping screw, and an adjusting screw carried by the other U-shaped gripping member and positioned to contact with a resiliently supported arm of said indicating device.

CONSTANTINE D. TRIPOLITIS.